United States Patent
Villarosa, Jr. et al.

(10) Patent No.: US 6,879,650 B1
(45) Date of Patent: Apr. 12, 2005

(54) CIRCUIT AND METHOD FOR DETECTING AND CORRECTING DATA CLOCKING ERRORS

(75) Inventors: Louis F. Villarosa, Jr., Tampa, FL (US); Mark D. Studebaker, Safety Harbor, FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/353,120

(22) Filed: Jul. 14, 1999

Related U.S. Application Data

(60) Provisional application No. 60/101,467, filed on Sep. 23, 1998.

(51) Int. Cl.[7] ................................................ H04L 7/00
(52) U.S. Cl. ..................................... 375/355; 370/503
(58) Field of Search .............................. 375/354, 355, 375/356, 360, 224, 226, 227, 228, 365, 368, 377, 219, 222; 370/503, 507, 516

(56) References Cited

U.S. PATENT DOCUMENTS

| | | | | |
|---|---|---|---|---|
| 4,481,648 A | * | 11/1984 | Fujii | ........................ 370/510 |
| 4,965,797 A | * | 10/1990 | Yamane et al. | ............. 327/407 |
| 5,479,455 A | * | 12/1995 | Hata | ........................... 375/356 |
| 5,526,361 A | * | 6/1996 | Hedberg | ..................... 370/518 |
| 5,768,283 A | * | 6/1998 | Chaney | ...................... 714/700 |
| 5,870,446 A | * | 2/1999 | Mc Mahan et al. | ......... 375/371 |
| 6,232,955 B1 | * | 5/2001 | Guttag et al. | ............... 345/601 |

* cited by examiner

*Primary Examiner*—Tesfaldet Bocure
*Assistant Examiner*—Pankaj Kumar
(74) *Attorney, Agent, or Firm*—Thomas, Kayden, Horstemeyer & Risley

(57) ABSTRACT

In a communications environment wherein data terminal equipment (DTE) transmits a data signal to data communication equipment (DCE) synchronously with a clocking signal provided by the DCE to the DTE, a circuit and method are configured to automatically detect a condition in which the data signal is sampled near a transition in the data signal, which may result in system clocking errors. Upon detecting this condition, the clocking signal used to sample the data signal is automatically inverted relative to the data signal to ensure that that the data signal is sampled near the midpoint between transitions in the data signal. In this manner, data clocking errors may be significantly reduced.

22 Claims, 8 Drawing Sheets

CIRCUIT AND METHOD FOR DETECTING AND CORRECTING DATA CLOCKING ERRORS

CROSS REFERENCE TO RELATED APPLICATIONS

This application claims priority to and the benefit of the filing date of and commonly assigned provisional application entitled CIRCUIT FOR AUTOMATICALLY INVERTING DATA CLOCK SIGNAL UPON DETECTION OF DATA CLOCKING ERROR, assigned Ser. No. 60/101,467, filed Sep. 23, 1998, now abandoned, which is hereby incorporated by reference.

TECHNICAL FIELD

The present invention relates generally to communication networks, and more particularly, to a data communication system having the capability of detecting and dynamically correcting clocking errors attributable to system delays.

BACKGROUND OF THE INVENTION

In the field of data communications, data terminal equipment (DTE) is the source or destination of data in a communication connection. The DTE is typically connected to data communication equipment (DCE), which is in turn connected to the communication channel. The DTE may be a dumb terminal or printer, however in most modern communication networks, the DTE is typically a computer, a bridge, or a router, which interconnects local area networks (LANs).

DCEs are typically modems or other types of communication devices. The DCE resides between the DTE and a communication channel. The DCE provides a connection for the DTE to send and receive data to and from the communication channel. Additionally, the DCE provides clocking to the DTE. In an analog communication network, such as a plain old telephone service (POTS) network, the DCE is typically a modem. In a digital communication network, such as a frame relay network, the DCE is typically a CSU/DSU (channel service unit/data service unit).

DTE and DCE interfaces are defined by the physical layer in the OSI (Open Systems Interconnection) model. The most common standards for DTE/DCE devices are EIA (Electronic Industries Association) RS-232-C and RS-232-D. Outside the United States, these standards are the same as the V.24 standard of the CCITT. Other DTE/DCE standards include the EIA RS-366-A, as well as the CCITT X.20, X.21, and V.35 standards. The later standards are used for high-speed communication over telephone lines.

As noted, clocking is provided by the DCE to the DTE. The DCE sends a clocking signal to the DTE, and the DTE responds by sending data synchronously with the clocking signal. Theoretically, there is perfect timing between the clocking signal transmitted by the DCE and the synchronous data signal transmitted by the DTE. In practice, however, there is some delay before the DTE data signal is transmitted. This delay is attributable to such factors as the physical proximity of the DCE and the DTE, the length of the cable connecting the DCE and the DTE, and temperature changes in the system.

FIG. 1 is a schematic view illustrating a typical prior art communication environment 5 in which a DTE 12 is interfaced to a communication channel 11 by a DCE 13. In the communication environment 5 illustrated in FIG. 1, the DCE 13 employs a typical prior art clocking circuit. A clock source 18 generates a timing signal (DCE ST), which is sent from the DCE 13 to the DTE 12 on connection 15. In response to signal DCE ST, the DTE 12 sends a data signal (DTE SD) to the DCE 13 on connection 16. The DCE 13 samples signal DTE SD in data latch 17. A clocking signal (SD LATCH CLK) is also provided by clock source 18 to data latch 17 on connection 14. The SD LATCH CLK signal is used to clock the sampling of signal DTE SD in data latch 17.

As illustrated in FIG. 1, in prior art systems the same clocking signal is typically used for signal DCE ST and signal SD LATCH CLK. However, in most installations connections 15 and 16 typically are much longer than connection 14. Thus, signals DCE ST and DTE SD typically are required to traverse much greater physical distances than signal SD LATCH CLK. As a result, signal DTE SD may be delayed in reaching data latch 17 relative to signal SD LATCH CLK. Temperature changes in the system may also result in varying delays.

Because data is sampled by the DCE 13 at clock transitions, if delays in the system become significant compared to the frequency of the data signal, data clocking errors may occur as follows: the DCE 13 may double sample the data, or the DCE 13 may miss sampling the data altogether. Such errors are more likely to occur as the data rate increases. This is especially troublesome as network designers strive for higher and higher data rates.

FIG. 2 is a graphical illustration of the DCE ST, DTE SD, and SD LATCH CLK signals of the communication environment 5 of FIG. 1. Signal DTE SD is sampled in data latch 17 (of FIG. 1) on the rising edge of the SD LATCH CLK signal. System delays, such as those discussed above, can cause data latch 17 to sample signal DTE SD at a transition in signal DTE SD. The sampling point for this condition is illustrated in FIG. 2 by reference numeral 19.

With reference back to FIG. 1, the effects of the above-described delay may be alleviated in some instances by sending signal SD LATCH CLK from the DCE 13 to the DTE 12 and having DTE 12 return signal SD LATCH CLK back to DCE 13. The DCE 13 then uses the returned clock signal (rather than the original clock signal) to sample the data. In this way, the time delay between the clock signal used for sampling and the DTE data signal is minimized. This type of timing scheme is typically referred to as terminal timing.

When the DTE does not have terminal timing capability, another way of addressing delay errors is by manually inverting the phase of the DCE's internal clock (i.e., signal SD LATCH CLK on connection 14 of FIG. 1) relative to the clock provided to the DTE (i.e., signal DCE ST on connection 15 of FIG. 1), so that signal DTE SD is sampled in the middle of the DCE's internal clock cycle rather than at a transition point. However, the efficacy of this method depends on the amount of delay in the system, which may differ depending on the specific installation. Each site must be evaluated and the manual inversion must be done on a site by site basis during installation, depending on the configuration of each site. However, post-installation changes in the DTE cable, in the DTE itself, or elsewhere in the system, can cause changes in the amount of delay present in the system. In such cases, subsequent manual intervention is required to adjust the clock phase.

Thus, there is a need in the industry for a circuit and method that detect clocking errors between DCEs and DTEs, and dynamically adjust the clock phase to eliminate such errors.

SUMMARY OF THE INVENTION

A circuit and method are presented that permit a DCE connected to a DTE to detect the condition in which the data signal transmitted to the DCE from the DTE is sampled near the transition of the data signal. Upon detecting this condition, the DCE's clocking signal is inverted relative to the DTE's data signal to ensure that that the DTE's data signal is sampled near the midpoint between data signal transitions. This is accomplished by obtaining two samples of the DTE's data signal during a time interval that is less than the period of the DCE's clocking signal. The time interval between the two samples is typically on the order of ⅛ of the period of the DCE's clocking signal. The two samples are then compared with each other. If the two samples are different, it is apparent that there was a transition in the DTE data signal during the time interval, which indicates a clocking error. If a clocking error is indicated, the invention automatically corrects the error by inverting the DCE's clocking signal relative to the DTE's data signal so that the sampling point is moved away from the transition of the DTE's data signal.

An advantage of the invention is that it automatically eliminates clocking errors in systems in which the DTE does not have terminal timing capability.

Another advantage of the invention is that it is automatic and requires no manual intervention.

Another advantage of the invention is that it dynamically adjusts to changes in a system, such as cabling changes and temperature changes.

Other features of the present invention will become apparent to one with skill in the art upon examination of the following drawings and detailed description. It is intended that all such additional features be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
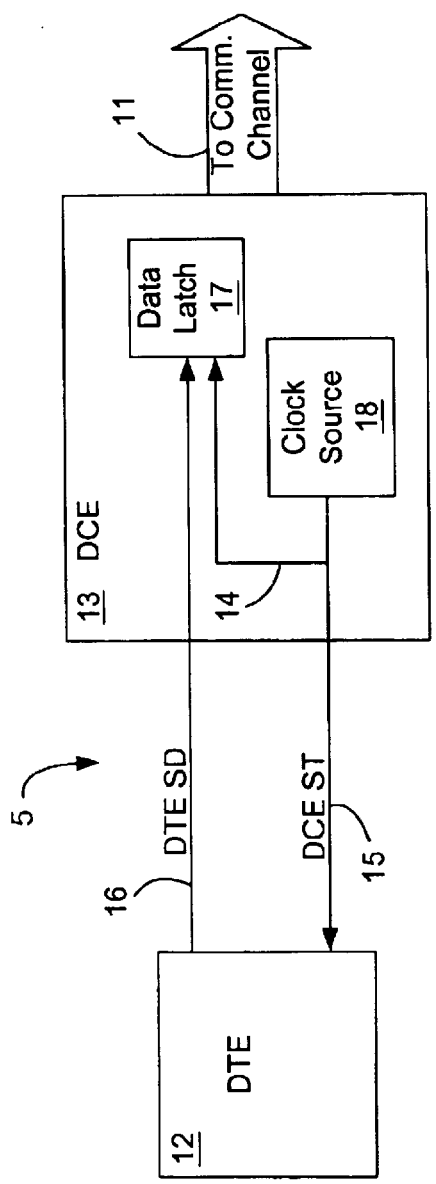
FIG. 1 is a schematic view illustrating a typical communication environment in which a DCE employing a typical prior art clocking circuit is used to interface a DTE to a communication channel.
Figure 2:
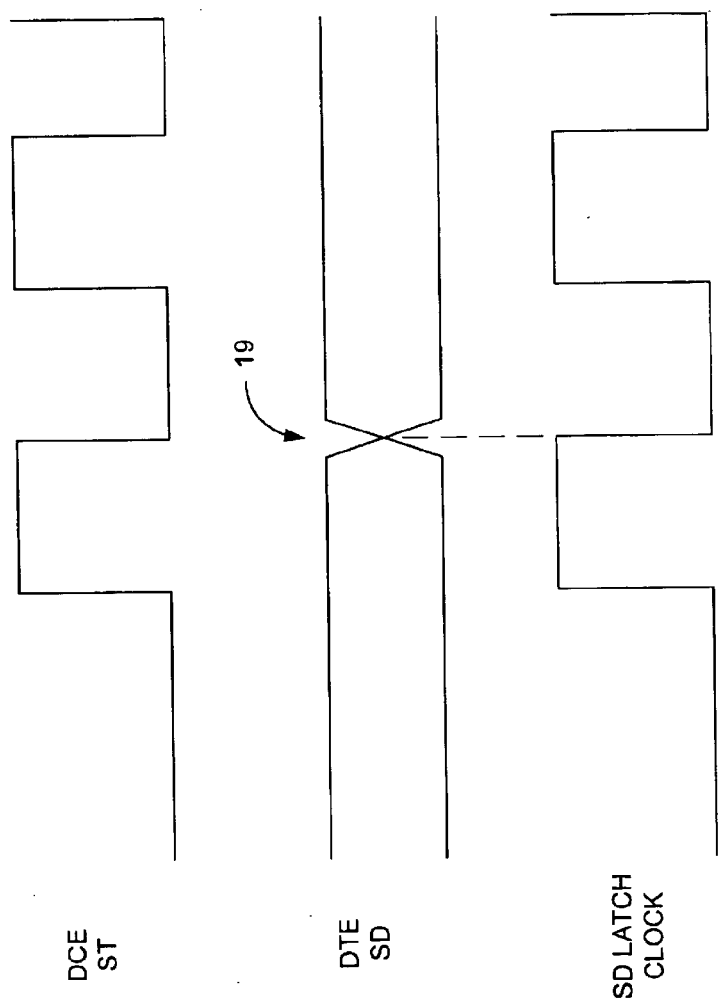
FIG. 2 is a graphical illustration of the data and clock signals of the clocking circuit of FIG. 1.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 3:
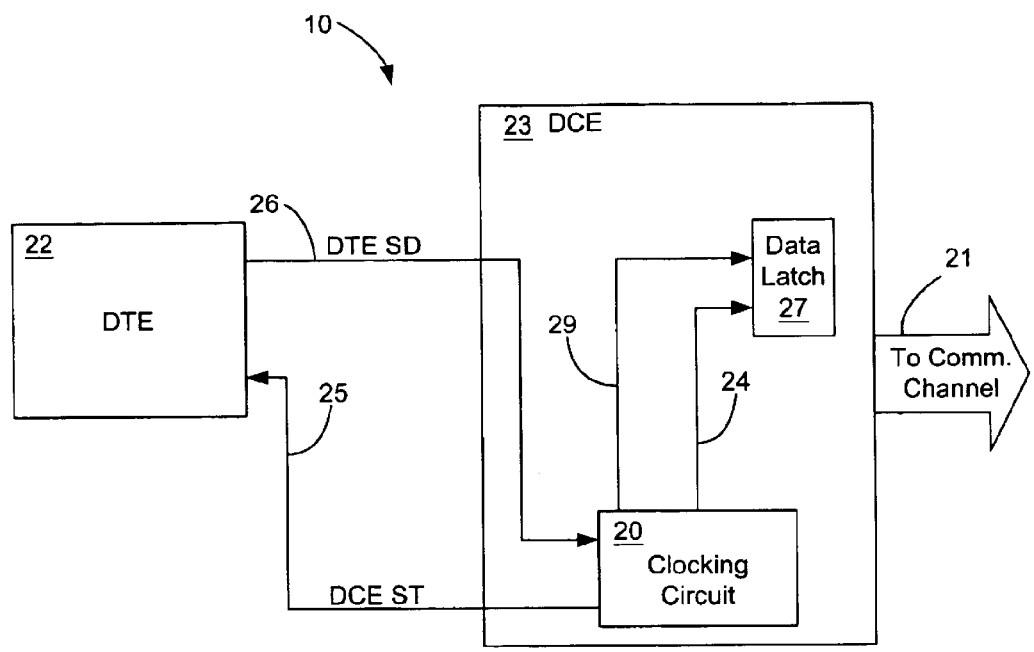
FIG. 3 is a schematic view illustrating a typical communication environment in which a DCE employing the clocking circuit of the present invention is used to interface a DTE to a communication channel.

FIG. 3 is a schematic view illustrating a typical communication environment 10 in which a DCE 23 employing the clocking circuit 20 of the present invention is used to interface a DTE 22 to a communication channel 21. Clocking circuit 20 generates a timing signal DCE ST, which is sent from the DCE 23 to the DTE 22 on connection 25. In response to signal DCE ST, the DTE 22 sends data signal DTE SD to the DCE 23 on connection 26. The clocking circuit 20 samples signal DTE SD and generates a reclocked signal corresponding to signal DTE SD (i.e., signal RCLK DTE SD), which is provided to data latch 27 on connection 29. The DCE 23 samples signal RCLK DTE SD in data latch 27. Clocking signal SD LATCH CLK is also provided to data latch 27 by clocking circuit 20 on connection 24. The SD LATCH CLK signal is used to clock the sampling of signal RCLK DTE SD in data latch 27.

As will be discussed below with reference to FIGS. 4 and 5, clocking circuit 20 detects whether signal DTE SD is being sampled at a transition point, which can lead to data sampling errors. If such is the case, the circuit inverts either signal DCE ST or signal SD LATCH CLK (but not both) so that the two signals are 180 degrees out of phase with respect to each other. By inverting one of these signals, the clocking circuit 20 ensures that signal DTE SD is not sampled at a transition point. By ensuring that signal DTE SD is not sampled at a transition point, the clocking circuit 20 automatically eliminates the data sampling errors that may occur when a signal is sampled near its transition point.

Figure 4:
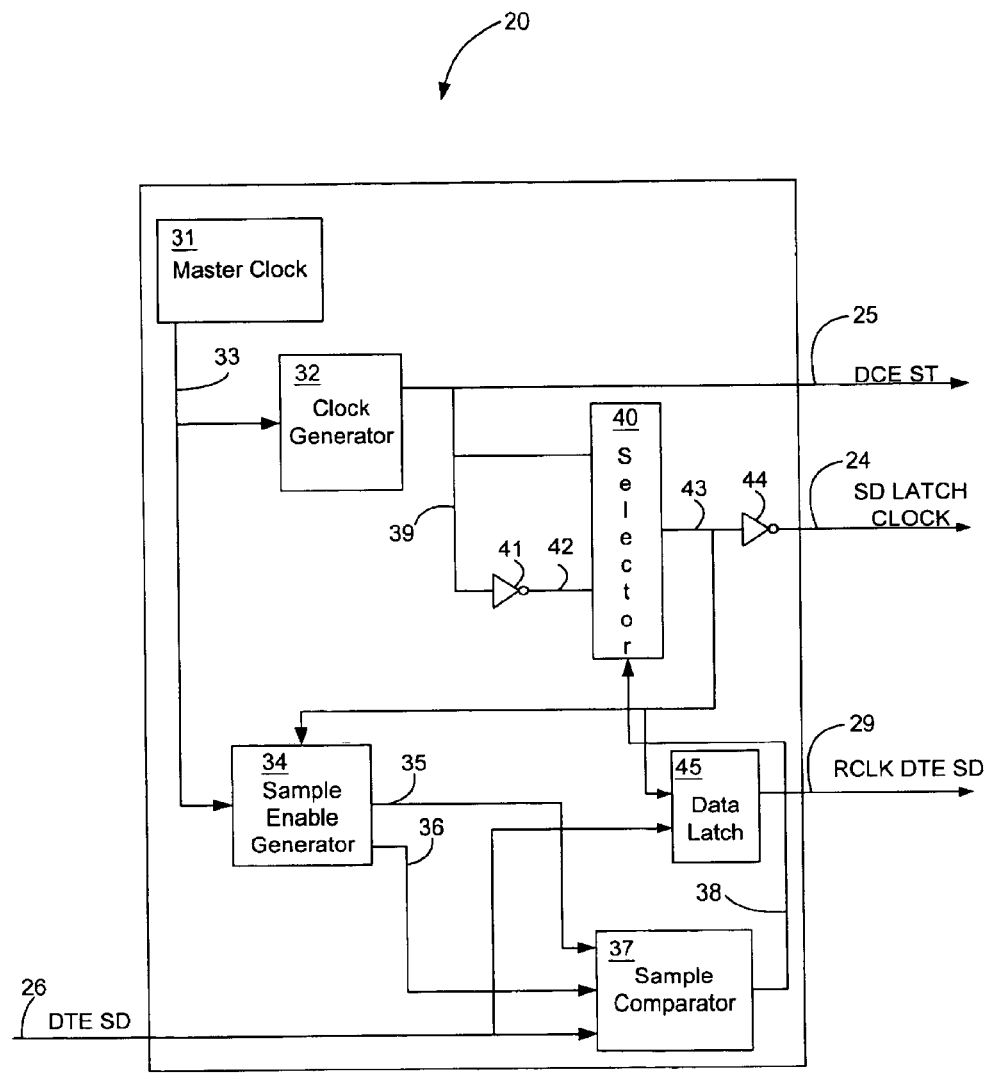
FIG. 4 is a schematic view illustrating a first embodiment of the clocking circuit of FIG. 3.

FIG. 4 is a schematic view illustrating a first embodiment of the clocking circuit 20 of FIG. 3. In this embodiment, a master clock 31 generates a master clock signal, which is provided to clock generator 32 and to sample enable generator 34 on connection 33. The master clock 31 runs at a higher frequency than the clock generator 32. In a preferred embodiment, the frequency of the master clock 31 is at least 8× the frequency of the clock generator 32. Clock generator 32 generates timing signals at a frequency equivalent to clock source 18 of FIG. 1. The output of clock generator 32 is signal DCE ST, which is provided to the DTE 22 (of FIG. 3) on connection 25.

Within clocking circuit 20, signal DCE ST is provided to one input of selector 40, as well as to inverter 41, on connection 39. The output of inverter 41 (i.e., an inverted version of signal DCE ST), is provided to another input of selector 40 on connection 42. Selector 40 is therefore able to select either signal DCE ST or an inverted version of signal DCE ST, as discussed hereinafter. The output signal of selector 40 (i.e., the signal selected by selector 40), is a clocking signal (INT CLK) that is internal to the clocking circuit 20. The INT CLK signal is provided on connection 43 to the following elements of clocking circuit 20: inverter 44, sample enable generator 34, and data latch 45.

The INT CLK signal is inverted by inverter 44. The output of inverter 44 is signal SD LATCH CLK, which is provided to data latch 27 of FIG. 3 on connection 24.

Figure 7:
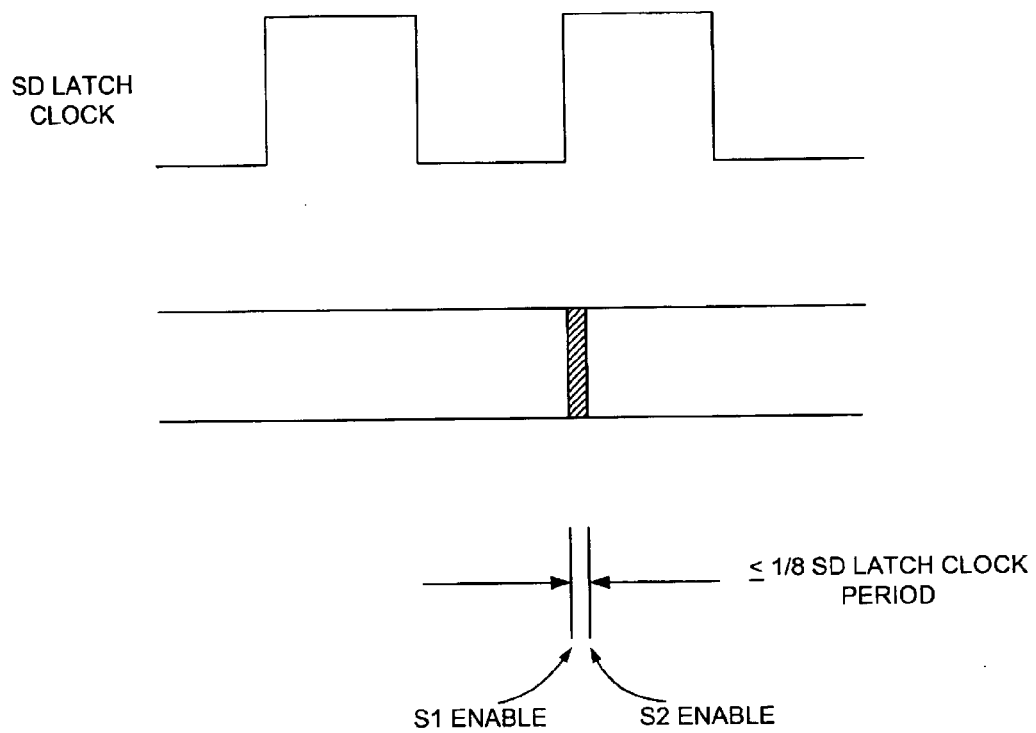
FIG. 7 is a graphical illustration of the sampling period of a first embodiment of the clocking circuits of FIGS. 4 and 5.

The clocking circuit 20 determines the phase of signal INT CLK relative to the phase of signal DCE ST as follows:

the master clock signal is provided to one input of sample enable generator 34 on connection 33. Signal INT CLK is provided to a second input of sample enable generator 34 on connection 43. The sample enable generator 34 generates two output signals: signal S1 ENABLE is generated on connection 35, and signal S2 ENABLE is generated on connection 36. In one embodiment, signal S1 ENABLE is asserted on the rising edge of the INT CLK signal, and signal S2 ENABLE is asserted a defined number of master clock periods later. In one embodiment of the invention, signal S2 ENABLE is asserted on the master clock period following assertion of signal S1 ENABLE. For a master clock 31 running at 8× the frequency of clock generator 32, this means that the time interval between the assertion of the S1 ENABLE signal and the assertion of the S2 ENABLE signal is ⅛ of the period of the SD LATCH CLK signal. The timing of this embodiment is illustrated in FIG. 7.

Figure 8:
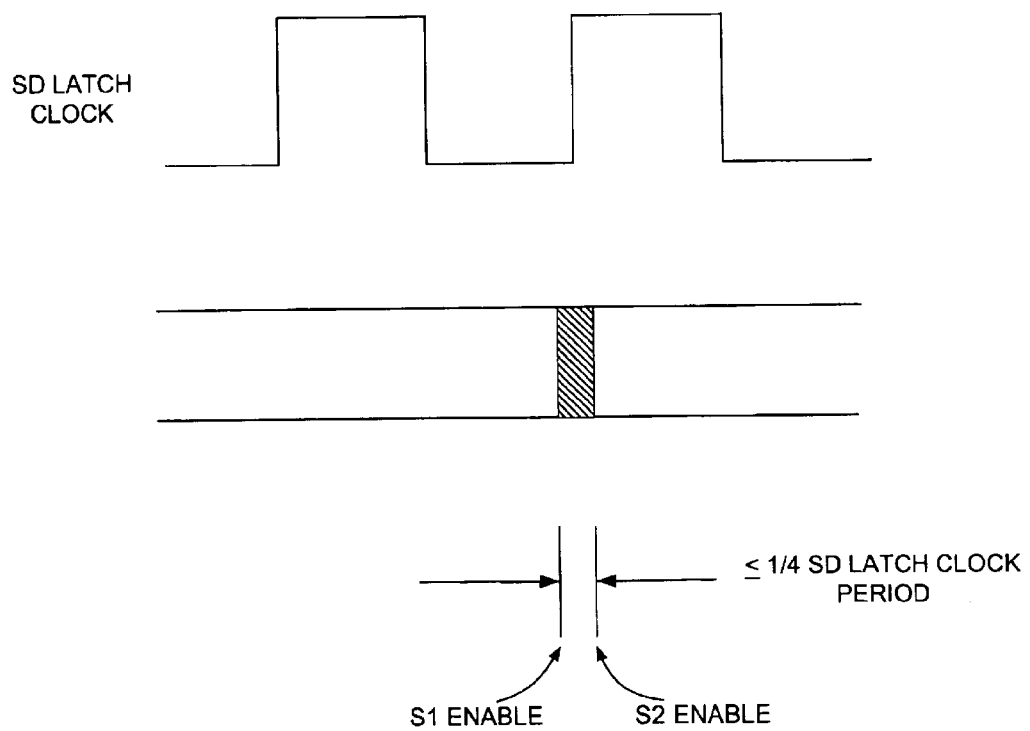
FIG. 8 is a graphical illustration of the sampling period of a second embodiment of the clocking circuits of FIGS. 4 and 5.

In an alternate embodiment of the invention, the S1 ENABLE signal is asserted one master clock period before the rising edge of the INT CLK signal. In this embodiment, the S2 ENABLE signal is asserted one master clock period after the rising edge of the INT CLK signal. The timing of this embodiment is illustrated in FIG. 8.

The S1 ENABLE signal is provided to a first input of sample comparator 37 on connection 35. The S2 ENABLE signal is provided to a second input of sample comparator 37 on connection 36. The DTE SD signal is provided to a third input of sample comparator 37 on connection 26. Sample comparator 37 compares the state of the DTE SD signal at the time that the S1 ENABLE signal is asserted with the state of the DTE SD signal at the time that the S2 ENABLE signal is asserted. The time interval between the assertion of the S1 ENABLE signal and the assertion of the S2 ENABLE signal determines the window in which non-equal samples of the DTE SD signal constitute a data transition condition, thereby indicating a clocking error in the system.

Clocking circuit 20 also contains data latch 45. Data latch 45 uses the INT CLK signal provided on connection 43 to latch the DTE SD signal provided on connection 26. As explained below, selector 40 selects either the DCE ST signal on connection 39 or the inverted DCE ST signal on connection 42 as the INT CLK signal. This choice ensures that the rising edge of the INT CLK signal occurs at approximately the midpoint of the transitions of the DTE SD signal. Data latch 45 therefore latches the DTE SD signal without error. The output of data latch 45 is the RCLK DTE SD signal, which is provided to data latch 27 of FIG. 3 on connection 29.

Because transitions of signal RCLK DTE SD are coincident with the rising edge of the INT CLK signal, the INT CLK signal on connection 43 is inverted by inverter 44 to generate the SD LATCH CLK signal. Due to this inversion, the SD LATCH CLK signal has a rising edge at approximately the midpoint of the RCLK DTE SD signal. The SD LATCH CLK signal is provided to data latch 27 of FIG. 3 on connection 24.

If the DTE SD signal does not undergo a transition during the interval between the assertion of the S1 ENABLE signal and the assertion of the S2 ENABLE signal, no clocking error is indicated. In this case, there is no need to change the phase of the DCE ST signal and the SD LATCH CLK signal relative to each other. Thus, the output of sample comparator 37, which is connected to selector 40 on connection 38, remains unchanged and selector 40 continues to maintain the current phase of the INT CLK signal on connection 43 relative to the DCE ST signal on connection 25.

On the other hand, if the DTE SD signal undergoes a transition during the interval between the assertion of the S1 ENABLE signal and the assertion of the S2 ENABLE signal, a clocking error is indicated. In this case, the output of sample comparator 37 changes, thereby directing the selector 40 to change the current phase of the INT CLK signal on connection 43 by 180 degrees. This causes data latch 45 to sample the DTE SD signal in the midpoint of the signal, rather than at a transition point (i.e., the transition of the DTE SD signal now occurs ½ bit period away from the sampling point, which is clocked by the INT CLK signal). Because the DTE SD signal is no longer sampled at a transition point, the clocking error is eliminated.

Figure 5:
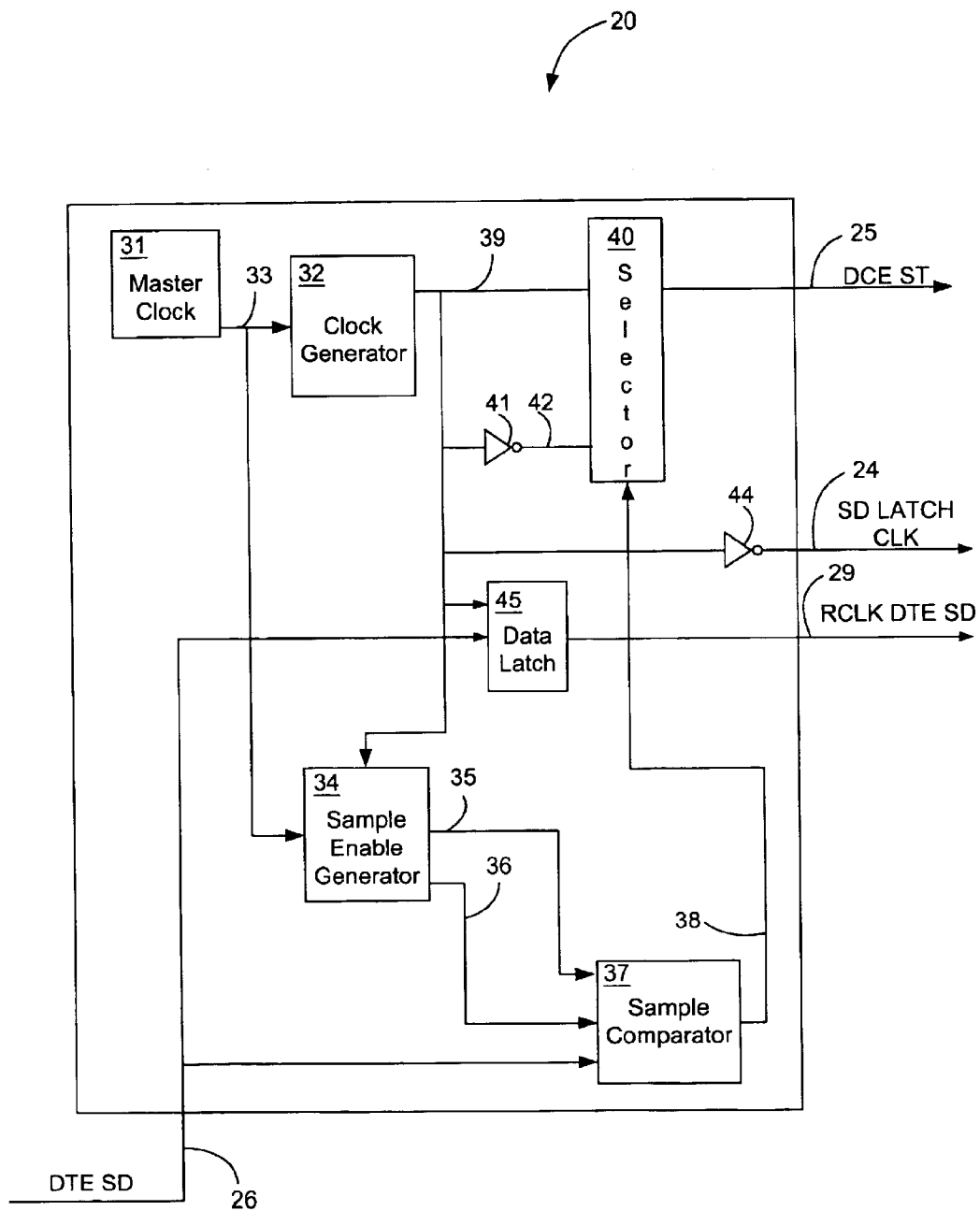
FIG. 5 is a schematic view illustrating a second embodiment of the clocking circuit of FIG. 3.

FIG. 5 is a schematic view illustrating a second embodiment of the clocking circuit 20 of FIG. 3. In this embodiment, a master clock 31 is used to generate a master clock signal on connection 33. The master clock signal drives clock generator 32. The master clock 31 runs at a higher frequency than clock generator 32. In a preferred embodiment, the frequency of the master clock 31 is at least 8× the frequency of the clock generator 32. Clock generator 32 generates timing signals at a frequency equivalent to clock source 18 of FIG. 1. The output of clock generator 32 is the INT CLK signal. The INT CLK signal is provided on connection 39 to inverter 44. The INT CLK signal is inverted by inverter 44, thereby becoming the SD LATCH CLK signal, which is provided to data latch 27 of FIG. 3 on connection 24.

Within clocking circuit 20, the INT CLK signal is also provided to one input of selector 40, and to inverter 41, on connection 39. The output of inverter 41 (i.e., an inverted version of the INT CLK signal), is provided to another input of selector 40 on connection 42. Selector 40 is therefore able to select either the INT CLK signal or the inverted version of the INT CLK signal as the DCE ST signal. The DCE ST signal is provided to DTE 22 of FIG. 3 on connection 25.

The clocking circuit 20 determines the phase of the INT CLK signal relative to the phase of the DCE ST signal as follows: the master clock signal is provided on connection 33 to one input of sample enable generator 34. The INT CLK signal is provided on connection 39 to a second input of sample enable generator 34. The sample enable generator 34 generates two output signals: S1 ENABLE, on connection 35, and S2 ENABLE, on connection 36. In one embodiment of the invention, the S1 ENABLE signal is asserted on the rising edge of the INT CLK signal, and the S2 ENABLE signal is asserted a defined number of master clock periods later. In a preferred embodiment of the invention, the S2 ENABLE signal is asserted on the master clock period following the assertion of the S1 ENABLE signal. For a master clock 31 running at 8× the frequency of clock generator 32, the time interval between the assertion of the S1 ENABLE signal and the assertion of the S2 ENABLE signal is ⅛ of the SD LATCH CLK period. The timing for this embodiment is illustrated in FIG. 7.

In an alternative embodiment of the invention, the S1 ENABLE signal is asserted one master clock period before the rising edge of the INT CLK signal. In this embodiment, the S2 ENABLE signal is asserted one master clock period after the rising edge of the INT CLK signal. The timing for this embodiment is illustrated in FIG. 8.

The S1 ENABLE signal is provided on connection 35 to one input of sample comparator 37. The S2 ENABLE signal is provided on connection 36 to a second input of sample comparator 37. The DTE SD signal is provided on connection 26 to a third input of sample comparator 37. Sample comparator 37 compares the state of the DTE SD signal at the time that the S1 ENABLE signal is asserted with the state of the DTE SD signal at the time that the S2 ENABLE signal is asserted. The time interval between the assertion of the S1 ENABLE signal and the assertion of the S2 ENABLE signal determines the window in which non-equal samples constitute a data transition condition.

If the DTE SD signal does not undergo a transition during the interval between the assertion of the S1 ENABLE signal and the assertion of the S2 ENABLE signal, no clocking error is indicated. In this case, there is no need to change the phase of the DCE ST signal and the INT CLK signal relative to each other. Therefore, the output of sample comparator 37, which is connected to selector 40 on connection 38, remains the same and directs the selector 40 to maintain the current phase of the DCE ST signal relative to the INT CLK signal on connection 39. The DCE ST signal is connected to the DTE 22 of FIG. 3 on connection 25.

On the other hand, if the DTE SD signal undergoes a transition during the interval between the assertion of the S1 ENABLE signal and the assertion of the S2 ENABLE signal, a clocking error is indicated. In this case, the output of sample comparator 37 changes, thereby directing the selector 40 to change by 180 degrees the current phase of the DCE ST signal provided to the DTE 22 of FIG. 3 on connection 25. Due to the phase shift in the DCE ST signal, timing of the DTE SD signal on connection 26 is altered so that the DTE SD signal no longer undergoes a transition during the time interval between assertion of the S1 ENABLE signal and the assertion of the S2 enable signal.

The INT CLK signal is also provided on connection 39 to data latch 45. Data latch 45 uses the INT CLK signal to latch the DTE SD signal, which is provided to data latch 45 on connection 26. Because the DTE SD signal is sampled in data latch 45 on the rising edge of the INT CLK signal (which in this condition is the inverted version of the DCE ST signal), data latch 45 samples the DTE SD signal in the midpoint of the signal, rather than at a transition point (i.e., the transition of the DTE SD signal, which is clocked by the INT CLK signal in data latch 45, now occurs ½ bit period away from the sampling point). Therefore data latch 45 latches the DTE SD signal without error. The output of data latch 45 is the RCLK DTE SD signal, which is provided to data latch 27 of FIG. 3 on connection 29.

Because transitions of the RCLK DTE SD signal are coincident with the rising edge of the INT CLK signal, the INT CLK signal must be inverted by inverter 44 to generate the SD LATCH CLK signal, which has a rising edge at the midpoint of the RCKL DTE SD signal. The SD LATCH CLK signal is provided to data latch 27 of FIG. 3 on connection 24.

Figure 6:
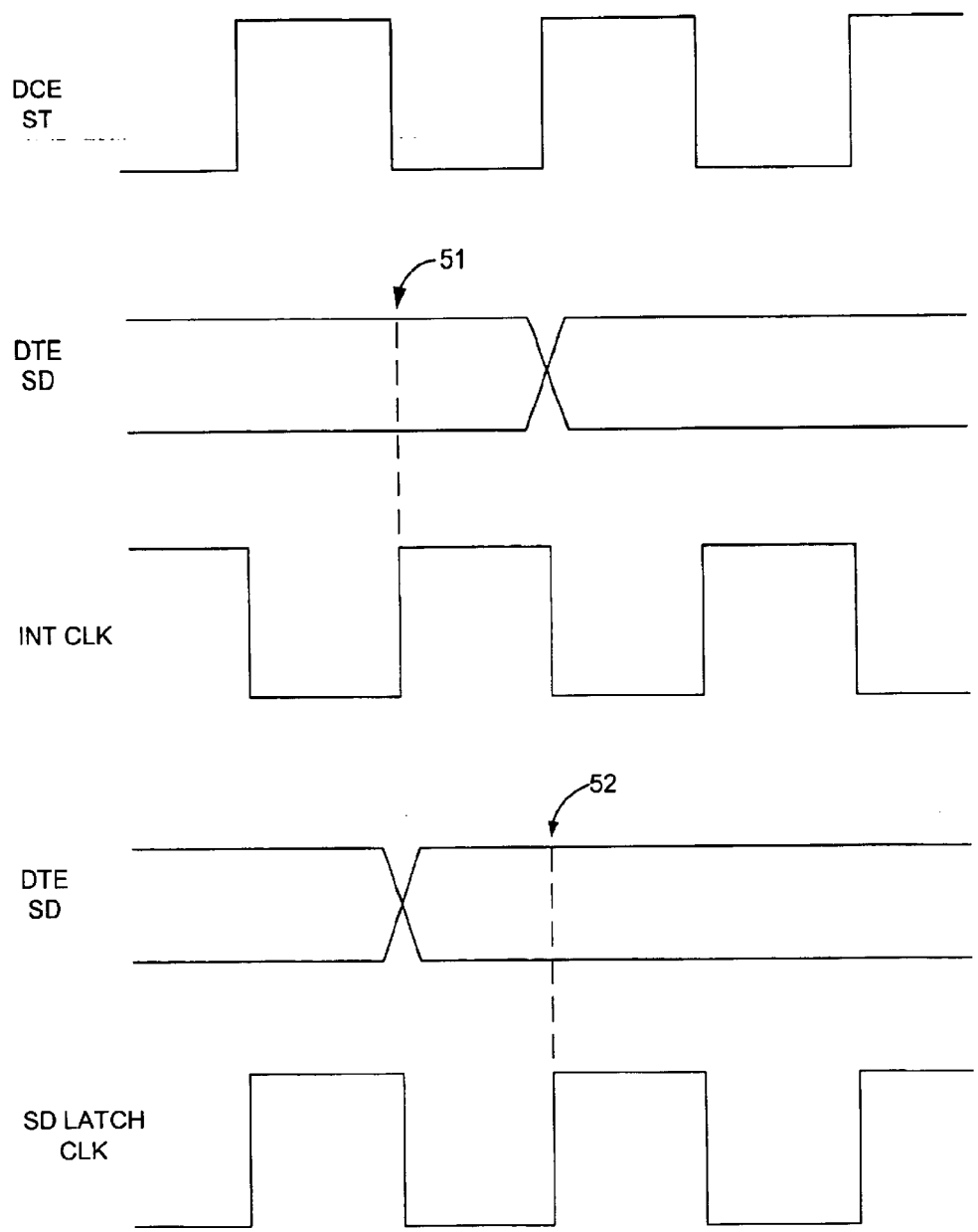
FIG. 6 is a graphical illustration of the data and clock signals of the clocking circuits of FIGS. 3, 4 and 5.

FIG. 6 is a graphical illustration of the data and clock signals of the clocking circuit of FIGS. 3, 4 and 5 when the DCE ST signal on connection 25 and the INT CLK signal (on connection 43 in FIG. 4 and on connection 39 in FIG. 5) are inverted relative to each other. As shown in FIG. 6, this inversion ensures that the DTE SD signal on connection 26 is sampled by latch 45 (as clocked by the INT CLK signal) away from a transition point of the DTE SD signal. This sampling point is indicated in FIG. 6 by reference numeral 51. The output of data latch 45, which is the RCLK DTE SD signal on connection 29, is then sampled in data latch 27 (as clocked by the SD LATCH CLK signal provided on connection 24), with the rising edge of the SD LATCH CLK signal occurring at the midpoint of the RCLK DTE SD signal rather than at a transition of the RCLK DTE SD signal. This sampling point is indicated in FIG. 6 by reference numeral 52.

FIG. 7 is a graphical illustration of a first embodiment of the SD LATCH CLK signal and the timing of the S1 ENABLE and S2 ENABLE signals. In this embodiment, the rising edge of the S1 ENABLE signal is coincident with the rising edge of the SD LATCH CLOCK signal, and the rising edge of the S2 ENABLE signal occurs at least ⅛ of the SD LATCH CLK period later.

FIG. 8 is a graphical illustration of a second embodiment of the SD LATCH CLK signal and the timing of the S1 ENABLE and S2 ENABLE signals for a master clock signal that is 8× the frequency of the SD LATCH CLK signal. In this embodiment, the rising edge of the S1 ENABLE signal occurs ⅛ of the SD LATCH CLK period before the rising edge of the SD LATCH CLK signal, and the rising edge of the S2 ENABLE signal occurs ⅛ of the SD LATCH CLK period after the rising edge of the SD LATCH CLK signal. Thus, in this embodiment, the sampling interval between the assertion of the S1 ENABLE signal and the assertion of the S2 ENABLE signal is ¼ of the period of the SD LATCH CLK.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, the master clock signal can be operated at frequencies other than 8× the frequency of the SD LATCH CLK signal, which will vary the sampling periods described above and illustrated in the Figures. All such modifications and variations are intended to be included herein within the scope of the present invention.

What is claimed is:

1. A circuit for detecting clocking errors in the synchronization of a DTE (data terminal equipment) data signal with a DCE (data communication equipment) clocking signal in a communication environment wherein the DCE interfaces the DTE to a communication channel at an interface rate determined by the DCE clocking signal, the circuit comprising:

a clock generating circuit configured to generate a master clock signal, a DCE clocking signal, and an internal clocking signal, each of the DCE clocking signal and internal clocking signal having a first frequency that is a fraction of the frequency of the master clock signal;

a sample enable generator configured to receive the master clock signal and the internal clocking signal and to generate a first sample enable signal at a first time and a second sample enable signal at a second time, the second time being subsequent to the first time; and a sample comparator having inputs that receive said first sample enable signal, said second enable signal and said DTE data signal, the sample comparator configured to sample the DTE data signal at the first time and sample the DTE data signal at the second time, the sample comparator further configured to compare the DTE data signal sampled at the first time with the DTE data signal sampled at the second time and determine, from the comparison, whether the DTE data signal has undergone a transition during the time interval between said first time and said second time.

2. The circuit of claim 1, wherein the frequency of said master clocking signal is approximately 8 times the frequency of said DCE clocking signal.

3. The circuit of claim 1, wherein the time interval between said first time and said second time is approximately ⅛ of the period of said DCE clocking signal.

4. The circuit of claim 1, wherein said sample comparator generates a selector control signal when the sample comparator determines that the DTE data signal has undergone a transition.

5. The circuit of claim 4, wherein the clock generating circuit comprises:

a clock generator that generates the DCE clocking signal;

an inverter that produces an inverted DCE clocking signal from the DCE clocking signal; and a selector that receives the DCE clocking signal and the inverted DCE clocking signal and produces the internal clocking signal that is selected, in response to the selector control signal, from the group consisting of the DCE clocking signal and the inverted DCE clocking signal.

6. The circuit of claim 5, further comprising:
a data latch, clocked by said internal clocking signal, for latching said DTE data signal.

7. The circuit of claim 6, wherein said first enable signal is generated on the rising edge of said output signal and said second enable signal is generated an integral number of master clock signals after said first enable signal.

8. The circuit of claim 6, wherein said first enable signal is generated one master clock period before the rising edge of said internal clocking signal and said second enable signal is generated one master clock period after the rising edge of said internal clocking signal.

9. The circuit of claim 4, wherein the clock generating circuit comprises:
a clock generator that generates said internal clocking signal;
an inverter that produces an inverted clocking signal from the internal clocking signal; and
a selector that receives the internal clocking signal and the inverted clocking signal and produces the DCE clocking signal that is selected, in response to the selector control signal, from the group consisting of the internal clocking signal and the inverted clocking signal.

10. The circuit of claim 9, further comprising:
a data latch, clocked by said internal clocking signal, for latching said DTE data signal.

11. The circuit of claim 10, wherein said first enable signal is generated on the rising edge of said internal clocking signal and said second enable signal is generated an integral number of master clock signals after said first enable signal.

12. The circuit of claim 10, wherein said first enable signal is generated one master clock period before the rising edge of said internal clocking signal and said second enable signal is generated one master clock period after the rising edge of said internal clocking signal.

13. A circuit for detecting and correcting clocking errors in the synchronization of a DTE (data terminal equipment) data signal with a DCE (data communication equipment) clocking signal in a communication environment wherein the DCE interfaces the DTE to a communication channel, the circuit comprising:
means for producing a master clock signal;
means for deriving a DCE clocking signal and an internal clocking signal from said master clock signal, said internal clocking signal having the same frequency as the DCE clocking signal;
means for obtaining a first sample of said DTE data signal at a first time and obtaining a second sample of said DTE data signal at a second time, said second time being subsequent to said first time, the interval between said first time and said second time being less than the period of the DCE clocking signal;
means for comparing said first sample to said second sample;
means for generating a selector control signal if said first sample is different from said second sample;
means for inverting said internal clocking signal to produce an inverted clocking signal; and
means for selecting, in response to said selector control signal, an output signal from the group consisting of said internal clocking signal and said inverted clocking signal.

14. The circuit of claim 13, wherein the interval between said first time and said second time is approximately ⅛ of the period of the DCE clocking signal.

15. The circuit of claim 13, further comprising:
means for latching said DTE data signal, the means for latching being clocked by said internal clocking signal.

16. A method for detecting and eliminating clocking errors in the synchronization of a DTE (data terminal equipment) data signal with a DCE (data communication equipment) clocking signal in a communication environment wherein the DCE interfaces the DTE to a communication channel, the method comprising the steps of:
providing an internal clocking signal having the same frequency as the DCE clocking signal;
obtaining a first sample of said DTE data signal at a first time and a second sample of said DTE data signal at a second time, said second time being subsequent to said first time, the time interval between said first time and said second time being less than the period of the DCE clocking signal;
comparing said first sample to said second sample;
determining whether the DTE data signal has undergone a transition during the time interval between the first time and the second time, a transition being determined when said first sample is not equal to said second sample, wherein the transition is indicative of a clocking error; and
eliminating a detected clocking error by inverting either one of the DCE clocking signal or internal clocking signal.

17. The method of claim 16, wherein the interval between said first time and said second time is approximately ⅛ of the period of the DCE clocking signal.

18. The method of claim 16, further comprising the step of:
generating a selector control signal if said first sample is different from said second sample.

19. The method of claim 18, further comprising the steps of:
inverting said internal clocking signal to produce an inverted clocking signal; and
producing said DCE clocking signal that is selected, in response to said selector control signal, from the group consisting of said internal clocking signal and said inverted clocking signal.

20. The method of claim 18, further comprising the steps of:
inverting said DCE clocking signal to produce an inverted clocking signal; and
producing said internal clocking signal that is selected, in response to said selector control signal, from the group consisting of said DCE clocking signal and said inverted clocking signal.

21. The method of claim 20, further comprising the step of:
latching said DTE data signal.

22. The method of claim 21, further comprising the step of:
performing said obtaining step and said latching step according to a time sequence referenced to said internal clocking signal.

* * * * *